United States Patent Office 3,197,272
Patented July 27, 1965

3,197,272
METHOD OF TREATING COOLING TOWERS
Carl W. Regutti, Glenshaw, Pa., assignor to Calgon Corporation, a corporation of Pennsylvania
No Drawing. Filed Sept. 5, 1961, Ser. No. 135,778
5 Claims. (Cl. 21—7)

This invention relates to methods of treating cooling towers to destroy fungi and other organisms therein and to provide protection against future attack by such organisms.

Industrial cooling towers generally contain large quantities of wood arranged in patterns around and over which water is circulated. Such cooling towers may be very small or may be valued in hundreds of thousands of dollars. The wood which is continuously in contact with water is frequently attacked by fungi and other microorganisms. The fungi are particularly difficult to combat because quite often they locate deep within the wood beyond the reach of virtually all presently known practical methods of combating them.

The accepted methods of cooling tower treatment heretofore have involved application of biocides to the surfaces of the wood in various ways. The economics of surface treatment dictates that the wood to which it is applied should be in good condition and free of internal rot. Since surface treatment is primarily preventive and not generally effective against internal infections of the wood, wood which is internally infected is generally replaced before the treatment is applied. Obviously, this procedure is not inexpensive.

Present methods of treating cooling towers to combat fungi include: (1) flowing or circulating a solution of fungicide or other biocide over the infected wood, (2) spraying a fungicide on the wood, and (3) the so-called double diffusion method in which an insoluble precipitate having biocidal properties is caused to be deposited in the wood by successively flowing solutions of two soluble compounds over the wood so that an insoluble biocidal material is formed by precipitation within the outer layers of wood. The latter method may be modified by the method disclosed in United States Patent No. 2,919,971.

The above-described methods are limited in effect, primarily in that they are unable to reach organisms imbedded any considerable distance in the wood. Although for a time any further introduction of organisms through the surface of the wood is prevented, the structural and functional members of the cooling tower may continue to be severely weakened by organisms acting from within. As explained above, the generally accepted treatment is to give up for lost any wooden member in which fungi have gained an interior foothold, replace it, and treat the new member by one of the known surface treatments. Due to the expense of the surface treatment, it is highly undesirable to treat partially deteriorated wood. Needless to say, replacement of all infected wood before treatment is not an inexpensive alternative, yet it is the only one heretofore accepted in the art.

I have invented an economic, efficient, long-lasting, and easily administered method of treating cooling towers to prevent deterioration by fungi and other organisms.

My method provides that the cooling tower or a portion thereof, such as a cell, is first put out of operation by halting the circulation of water. It may be allowed to drain for a day or two. The tower is then enclosed with a plastic, canvas, or other cover, and steam, preferably under some degree of pressure, is introduced to the interior of the cooling tower. The steam is continuously introduced and permitted to remain in the tower in such manner that the interior of the wood reaches at least about 135° F. and remains at least at that temperature for about two hours. Lower temperatures may be effective when held for longer periods of time and higher temperatures are effective for shorter periods of time. All factors considered, it has been found that optimum conditions for a large cooling tower are 145–155° F. for at least about two hours. After these conditions have been achieved, a conventional surface treatment may be performed. That is, the wooden members may be sprayed with a biocide, a biocide may be added to the circulating water, the double diffusion method may be applied, or a combination of these or other surface treatments may be used. I prefer, however, to utilize what I have called the "steam distillation" method of surface treatment. In the steam distillation method, after the tower has been held at the desired elevated temperature for the desired period of time, a portion of the steam is diverted through a chemical container having therein a quantity of steam-distillable fungicide or wide-spectrum biocide. This biocide is carried over with the steam and distributed through all parts of the cooling tower, preferably over a period long enough to insure that all the wood surface has become completely impregnated. The steam flow is then stopped and the tower allowed to cool, preferably without removing the temporary enclosure. During the initial steaming process, the elevated temperatures will have caused a partial dehydration of the wood. On cooling, the fungicide or biocide is drawn into the wood much deeper than is ordinarily possible with conventional surface treatments because of the tendency of the wood to replace its lost moisture and air.

Steam-distillable fungicides useable in my invention include:

2,4,5-trichlorophenol;
dodecyl guanidine acetate;
2,4,6-trichlorophenol;
orthophenylphenol;
chloro-p-phenylphenol;
a mixture of 75% tetrachlorophenol and 22% pentachlorophenol;
2,3,4,6-tetrachlorophenol;
sodium-o-phenylphenate;
1,4-bis-bromacetoxy-2-butene;
octadecylamine acetate;
liquid chloro-o-phenylphenol;
bis-(tri-n-butyl tin) oxide;
sodium dimethyl dithio carbamate;
creosote;
1 - (2 - hydroxyethyl) - 2 - n - alkyl - 1(4 - chlorobutyl)-2-imidazolinium chloride.

These compositions are intended as examples only. Chlorinated phenols generally are useable in my invention. By the term "steam-distillable fungicide" or biocide. I mean to include any biocide or fungicide which may be carried by steam. They may be liquids or solids. They may be picked up and entrained by the steam by passing the steam (or a portion thereof) through a container of liquid, crystals, or other particles of the biocide or fungicide. If a solid is used, it may be melted first by the steam. They may be boiled into the steam line by a separate source of heat or by a diverted stream of a portion of the steam. If a separate source of heat is used, care should be taken if the biocide is flammable. Although some biocides may resist being entrained by steam at relatively low temperatures, it is, of course, understood that I include as steam-distillable compositions any biocide or fungicide which may be entrained and carried by steam at temperatures conveniently handled at the cooling tower site. Such temperatures may run several hundred degrees above the boiling temperature of water. In some cases, the biocide composition may be itself vaporized, and in other cases it may be carried in the form of droplets affixed to droplets of water vapor or partially dissolved in such droplets of water vapor. I do not intend to be bound by any particular mechanism of biocide entrainment and have no reason to believe that any one mechanism is superior.

Several advantages of my preferred process are significant:

(1) The wood is thoroughly sterilized throughout. Internal rot is halted, thus rendering it unnecessary to replace infected wood.

(2) The protective surface treatment is performed while the wood is in a sterilized state.

(3) The fungicide or biocide used may be insoluble in water, thus less likely to be washed away. It penetrates deep into the wood.

(4) Labor costs are reduced.

(5) Human contact with highly toxic biocides is reduced.

(6) Distribution is more even and reaches otherwise inaccesible places.

The same advantages are obtained though perhaps to a somewhat lesser degree, through utilization of conventional surface treatment after steam sterilization. Since the wood is virtually completely sterilized by the initial steam treatment, conventional surface treatment can be used to much greater advantage. For example, it may be applied to wood partially infected with internal rot. However, the steam distillation method is preferred because it can be applied without danger of reinfection after sterilization and before surface treatment and because water-insoluble biocides may be used. Although the spraying technique, when properly performed, is perhaps capable of applying a thicker coating of biocide, it is, of course, not effective on surfaces inaccessible to the sprayers. Spraying also involves higher labor costs and may result in the introduction of greater amounts of biocide into the sump water. Circulating water treatment is, of course, not as effective in places such as the mist eliminator slats, where the circulating water is not likely to contact the wood.

However, I intend to include within the scope of my invention the application of any surface infection prevention treatment preceded by stream sterilization as described.

When the above preferred treatment is followed, the treated portion of cooling tower will be virtually sterilized even in the innermost portions of the thickest wooden parts. However, in some cases, it is found that the wood which is adjacent to an operating cell cannot be heated within 10 or 20 degrees Fahrenheit of the desired temperature without the expenditure of large amounts of steam. In such cases, a slightly longer period of steam treatment is recommended. In any event, even as low as 80% fungi kill may provide excellent prolongation of the life of internally infected wood.

The fungicide or biocide may consist of or include a toxic dye which is absorbed in the wood in the same manner as conventional biocides. Fading of the color thus may serve as an indication of the need for further treatment. In much the same manner as the application of biocides, polymer coatings such as epoxy resins may be applied to the wood. Such coatings may be applied after the biocide to serve as physical protection against reinfection and also to inhibit the leaching out or eroding of the applied biocide into the circulating water. Polymer coatings may be applied by spray, steam entrainment, or any other method.

A practical field demonstration of the steam sterilization technique was conducted at a large (48,000 cubic feet) redwood cooling tower cell at an oil refinery on the gulf coast. The tower was not ideal for this treatment in that it was impossible to cover it completely; that is, there were openings even after covering which permitted steam to escape into the atmosphere. The wood was severely rotted internally.

The cell was first shut down for two days to permit saturated wood to lose some of its moisture so that the wood could be heated without the expenditure of unnecessary quantities of heat. Thermocouples were sealed into the center of pieces of wood at significant locations. Cultures were taken from comparable wood members for laboratory evaluation as controls. Two 2″ pipe lines containing nozzles to create divergent streams of steam were attached to a common steam header and placed under the bottom fill immediately above the sump water. The cell was then sealed as well as possible; however, several openings remained. A rectangular openings about 2′ x 20′ remained at the top of the cell.

Steam was injected at about 17,000 lbs./hr. The internal wood temperatures in the beginning were about 50–70° F. Within 3½ hours all the fill wood and heavier structural members (2 x 2's and 4 x 4's) were in the range of 145–155° F. Most of the fill wood, being of small dimensions, reached these temperatures within ½ hour. After 3½ hours, the steam was shut off. The process was then halted in order to take samples for comparison with the controls. The following table (Table I) illustrates the effectiveness of the steam sterilization process:

*Table I*

| Sample location | Steaming | | Fungal cultures | |
| --- | --- | --- | --- | --- |
| | Temp. (° F.) | Time (min.) | Before steaming | After steaming |
| Fill wood slat (front top left) | 145–150 | 140 | 5+ | 0 |
| Fill wood slat (front center) | 145–150 | 140 | 5+ | 0 |
| Fill wood slat (front bottom right) | 125–130 | 170 | 5+ | 2+ |
| Fill wood slat (back bottom left) | 150–155 | 170 | 5+ | 0 |

In a subsequent field test on the same tower, a similar preliminary procedure was followed. In addition, samples of new redwood and gumwood were placed in different locations of the cell to test the effect of the treatment on new wood. In this test, steam was injected at the rate of 31,000 lbs./hr. to determine the time required to elevate the wood temperatures to the desired level. Most of the fill wood heated to 145° F. in one-half the time required in the first test using 17,000 lbs./hr. After three hours of fill wood and heavy structural members (4 x 4's) were heated to 145–160° F. In this period, approximately twice the amount of steam was consumed as in the initial test.

After all wood had been maintained at at least 150° F. for at least two hours, a portion of the steam was bypassed through a container of 200 lbs. of 90% active 2,4,6-trichlorophenol crystals and redirected into the steam nozzle line. The steam was then turned off and the cell permitted to cool while still covered. In some cases the fungicide could be seen and smelled near the surface of the wood while in others it was present in significant amounts although it could not be seen nor smelled.

All of the wood was completely sterilized as may be seen from the following table (Table II):

*Table II*

| Sample location | Steaming | | Distillation | | Fungal cultures | |
|---|---|---|---|---|---|---|
| | Temp. (°F.) | Time (min.) | Temp. (°F.) | Time (min.) | Before steaming | After steaming |
| Fill Wood Slat (front top left) | 150–155 | 140 | 145–150 | 60 | 5+ | 0 |
| Fill Wood Slat (front center) | 150–155 | 110 | 140–145 | 70 | 5+ | 0 |
| Fill Wood Slat (front bottom right) | 145–150 | 120 | 140–145 | 60 | 5+ | 0 |
| Fill Wood Slat (back bottom left) | 145–155 | 140 | 140–145 | 60 | 5+ | 0 |
| Front Lower Mist Eliminator | 150–160 | 120 | 145–150 | 50 | 5+ | 0 |

The new redwood and gumwood samples and samples of the cooling tower were subjected to cultures of fungi commonly found on cooling towers. Growth on the wood was completely inhibited.

Another field trial was performed on a forced draft cooling tower of an older design. Samples were taken, thermocouples were imbedded and the tower was covered as in the previous cases. In this case steam was injected at 60,000 lbs./hr. Within thirty minutes all the fill wood and mist eliminator wood attained 160° F. internal temperature, and within two hours all wood including 4 x 6 structural members near the sump water had temperatures of 175–185° F. After three hours, it was noted that the temperatures did not rise above this range, and part of the steam was diverted through a container of 2,4,6-trichlorophenol crystals. Complete sterilization was obtained, as was evidenced by cultures taken at various points as in the previous examples. A significant quantity of fungicide had been absorbed by wood in all portions of the tower.

The examples and illustrations presented herein are not intended to be limiting. My invention may be otherwise variously practiced within the scope of the following claims.

I claim:
1. Method of treating a cooling tower to inhibit deterioration comprising enclosing said cooling tower with an impervious temporary cover, introducing steam into said cooling tower until the temperature has been held at a sufficient elevation for a period of time sufficient to substantially sterilize said cooling tower, passing a portion of inflowing steam through a container of steam-distillable biocide and into the cooling tower, halting the introduction of steam, and allowing the cooling tower to cool.

2. Method of treating a cooling tower comprising substantially enclosing said cooling tower, introducing steam into said cooling tower until the temperature has been held at a sufficient elevation for a period of time sufficient to substantially sterilize said cooling tower, then applying a biocide to the surfaces of said cooling tower.

3. Method of treating a cooling tower comprising substantially enclosing at least a portion thereof, heating the wood in said cooling tower to at least about 135° F. by introducing steam into the portion of cooling tower so enclosed, introducing a biocide into said tower with the steam, and holding the temperature of the wood at a temperature of at least 135° F. for a period of time sufficient to substantially sterilize said wood.

4. Method of treating a cooling tower containing wooden members to inhibit microbiological deterioration comprising
    (a) enclosing said cooling tower in an impervious temporary cover,
    (b) introducing steam into said cooling tower within said impervious cover until the internal temperature of its wooden members have been held at least at 135° F. for a period of time sufficient to substantially sterilize said wooden members,
    (c) entraining a steam-distillable biocide in at least a portion of the steam prior to introduction of said steam to the cooling tower,
    (d) halting the introduction of steam to said cooling tower,
    (e) allowing the cooling tower to cool after halting the introduction of steam thereto, whereby the wood members present in the cooling tower become impregnated with biocide.

5. The method of claim 4 in which the steam-distillable biocide is entrained in the steam by passing said steam through a container of steam-distillable biocide.

References Cited by the Examiner

UNITED STATES PATENTS

| 84,733 | 12/68 | Cowling | 21—66 |
| 102,725 | 5/70 | Stevens | 21—66 |
| 120,355 | 10/71 | Wells | 21—57 |
| 1,401,292 | 12/21 | Van Meter | 21—109 |
| 1,934,826 | 11/33 | Shepherd. | |

FOREIGN PATENTS

| 732,810 | 6/55 | Great Britain. |

OTHER REFERENCES

Wood Preservation, Hunt and Garratt, First Edition, McGraw-Hill Book Co., Inc., New York, 1938 (pp. 154, 167 and 372 cited).

MORRIS O. WOLK, *Primary Examiner.*

DONALL H. SYLVESTER, *Examiner.*

UNITED STATES PATENT OFFICE
CERTIFICATE OF CORRECTION

Patent No. 3,197,272                                                      July 27, 1965

Carl W. Regutti

It is hereby certified that error appears in the above numbered patent requiring correction and that the said Letters Patent should read as corrected below.

Column 4, line 33, for "2 x 2's" read -- 2 x 4's --; column 5, line 30, for "175-185° F." read -- 170-185° F. --.

Signed and sealed this 8th day of February 1966.

(SEAL)
Attest:

ERNEST W. SWIDER
Attesting Officer

EDWARD J. BRENNER
Commissioner of Patents